(12) United States Patent
Delgoshaei et al.

(10) Patent No.: US 11,898,764 B2
(45) Date of Patent: Feb. 13, 2024

(54) HVAC SYSTEM LEAK DETECTION

(71) Applicant: Lennox Industries Inc., Richardson, TX (US)

(72) Inventors: Payam Delgoshaei, Addison, TX (US); Eric Berg, The Colony, TX (US)

(73) Assignee: Lennox Industries Inc., Richardson, TX (US)

( * ) Notice: Subject to any disclaimer, the term of this patent is extended or adjusted under 35 U.S.C. 154(b) by 0 days.

(21) Appl. No.: 18/153,237

(22) Filed: Jan. 11, 2023

(65) Prior Publication Data

US 2023/0160587 A1 May 25, 2023

Related U.S. Application Data

(63) Continuation of application No. 17/352,077, filed on Jun. 18, 2021, now Pat. No. 11,578,887.

(51) Int. Cl.
*F24F 11/36* (2018.01)
*F24F 11/84* (2018.01)
(Continued)

(52) U.S. Cl.
CPC ............ *F24F 11/36* (2018.01); *F24F 11/84* (2018.01); *F24F 11/86* (2018.01); *F24F 2140/12* (2018.01); *F24F 2140/20* (2018.01)

(58) Field of Classification Search
CPC .... F25B 49/02; F25B 41/06; F25B 2700/193; F25B 2700/1933; F25B 2500/22; F25B 2500/221; F25B 2500/222; F24F 11/30
See application file for complete search history.

(56) References Cited

U.S. PATENT DOCUMENTS 6,205,798 B1 * 3/2001 Porter ................. G01M 3/3227
62/131
10,533,783 B2 * 1/2020 Xue ....................... F25B 13/00
(Continued)

FOREIGN PATENT DOCUMENTS

CN 210663193 U 6/2020
GB 2577445 A 3/2020
(Continued)

OTHER PUBLICATIONS

Extended European Search Report, Application No. 22175469.0, dated Nov. 9, 2022.

*Primary Examiner* — Nelson J Nieves
*Assistant Examiner* — Meraj A Shaikh
(74) *Attorney, Agent, or Firm* — Baker Botts L.L.P.

(57) ABSTRACT

An HVAC system includes a high-pressure subsystem and a low-pressure subsystem. After determining that refrigerant leak diagnostics should be performed, a controllable valve is closed between a condenser and compressor of the HVAC system. The compressor then operates until a predetermined input refrigerant pressure is reached. After the predetermined input refrigerant pressure is reached, operation of the compressor is stopped. After stopping operation of the compressor and waiting at least a predetermined wait time, the pressure in the low-pressure subsystem of the HVAC system is monitored. A rate of change of the pressure in the low-pressure subsystem is determined. If the rate of change is negative and a magnitude of the rate of change is greater than a threshold value, a leak location is determined to be in the low-pressure subsystem.

20 Claims, 3 Drawing Sheets

(51) Int. Cl.
  *F24F 11/86* (2018.01)
  *F24F 140/12* (2018.01)
  *F24F 140/20* (2018.01)

(56) References Cited

U.S. PATENT DOCUMENTS

2019/0170415 A1* 6/2019 Walser ................. F25B 49/005
2019/0242632 A1* 8/2019 Sakae ................... F25B 49/005

FOREIGN PATENT DOCUMENTS

GB          2577445 A8    3/2020
JP         2014145565 A   8/2014

* cited by examiner

HVAC SYSTEM LEAK DETECTION

CROSS-REFERENCE TO RELATED APPLICATION

This application is a continuation of U.S. patent application Ser. No. 17/352,077, filed Jun. 18, 2021, by Payam Delgoshaei, entitled "HVAC SYSTEM LEAK DETECTION" which is incorporated herein by reference.

TECHNICAL FIELD

The present disclosure relates generally to heating, ventilation, and air conditioning (HVAC) systems and methods of their use. In particular, the present disclosure relates to HVAC system leak detection.

BACKGROUND

Heating, ventilation, and air conditioning (HVAC) systems are used to regulate environmental conditions within an enclosed space. Air is cooled via heat transfer with refrigerant flowing through the HVAC system and returned to the enclosed space as cooled conditioned air. Leakage of the refrigerant can result in decreased system performance.

SUMMARY OF THE DISCLOSURE

The leakage of refrigerant, or loss of charge, from an HVAC system can result in decreased system performance (e.g., loss of desired cooling, increased energy consumption, etc.), eventual damage to system components, and potential risk to people and the environment. For example, the cooling capacity of an HVAC system may decrease as refrigerant leaks from the system. The leaked refrigerant may be harmful to people and the environment. Previous technology used to detect refrigerant leaks fails to provide information about the location of a leak. Because of this, extensive diagnostics must be performed by specially trained technicians to search for the location of a refrigerant leak. This can result in significant delays in locating and repairing a refrigerant leak and corresponding downtimes during which cooling cannot be provided to a space. In some cases, even small refrigerant leaks, which may go undetected and/or unlocated by previous technology, may pose a risk to people and/or the environment. For instance, certain HVAC systems use flammable refrigerant. Flammable refrigerant may leak, causing unsafe concentrations of gas to be dispersed within an occupied space. In addition to the risk of fire, unsafe concentrations of gas within the space may be harmful to the health of the space's occupants and particularly to the elderly and sick.

This disclosure provides technical solutions to the problems of previous technology, including those described above. For example, this disclosure recognizes that the ability to automatically and reliably detect a leak and its location within an HVAC system can decrease maintenance downtimes, increase the lifetime of the HVAC system and its components, and improve the safety of people and the environment. As described further below, if a possible leak is detected, a valve may be closed between high-pressure and low-pressure subsystems of the HVAC system (e.g., between a condenser and evaporator). The HVAC system's compressor can then be operated until a predetermined input refrigerant pressure is reached for the compressor. Operation of the compressor is then stopped, and the pressure of the low-pressure side of the HVAC system is monitored for a period of time. This disclosure recognizes that the rate of change of this monitored pressure can be used to determine a leak location of the refrigerant (e.g., whether refrigerant is leaking from the low-pressure or high-pressure subsystem of the HVAC system).

Embodiments of this disclosure may improve the speed and reliability with which refrigerant leaks can be detected and appropriate maintenance can be performed. As such, the system described in this disclosure may significantly decrease downtimes during which cooling cannot be provided by an HVAC system. Embodiments of this disclosure may also improve the overall safety of HVAC systems and the spaces cooled by HVAC systems. For example, refrigerant may be primarily held in a high-pressure subsystem of the HVAC system that is in an outdoor space when a refrigerant leak is detected. Since the majority of the refrigerant is held in the outdoor space, accumulation of leaking refrigerant in an indoor living space is reduced or prevented. Certain embodiments may include none, some, or all of the above technical advantages. One or more other technical advantages may be readily apparent to one skilled in the art from the figures, descriptions, and claims included herein.

In an embodiment, an HVAC system includes a high-pressure subsystem and a low-pressure subsystem. The high-pressure subsystem includes a condenser operable to receive refrigerant and transfer heat from the refrigerant to a flow of outdoor air, thereby generating a cooled refrigerant, and a controllable valve positioned in a refrigerant conduit connecting the condenser to an evaporator. The low-pressure subsystem includes the evaporator operable to receive the cooled refrigerant and transfer heat from a flow of air to the cooled refrigerant, a compressor operable to compress the refrigerant, and a pressure sensor operable to measure a refrigerant pressure in the low-pressure subsystem. A controller is communicatively coupled to the pressure sensor, the compressor, and the controllable valve. The controller determines that refrigerant leak diagnostics should be performed for the HVAC system (e.g., based on a timer/schedule and/or a detection of the possible leak of refrigerant). After determining that the refrigerant leak diagnostics should be performed, the controllable valve is closed. The compressor then operates until a predetermined input refrigerant pressure is reached. After the predetermined input refrigerant pressure is reached, operation of the compressor is stopped (e.g., the compressor is turned off or to a speed of zero). After stopping operation of the compressor and waiting at least a predetermined wait time, the pressure in the low-pressure subsystem of the HVAC system is monitored for a period of time. A rate of change of the pressure in the low-pressure subsystem is determined for the period of time. If the rate of change is negative and a magnitude of the rate of change is greater than a threshold value, a leak location of the refrigerant is determined to be in the low-pressure subsystem of the HVAC system. However, if one or both of the rate of change is not negative and the magnitude of the rate of change is not greater than a threshold value, the leak location of the refrigerant may be in the high-pressure subsystem of the HVAC system.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
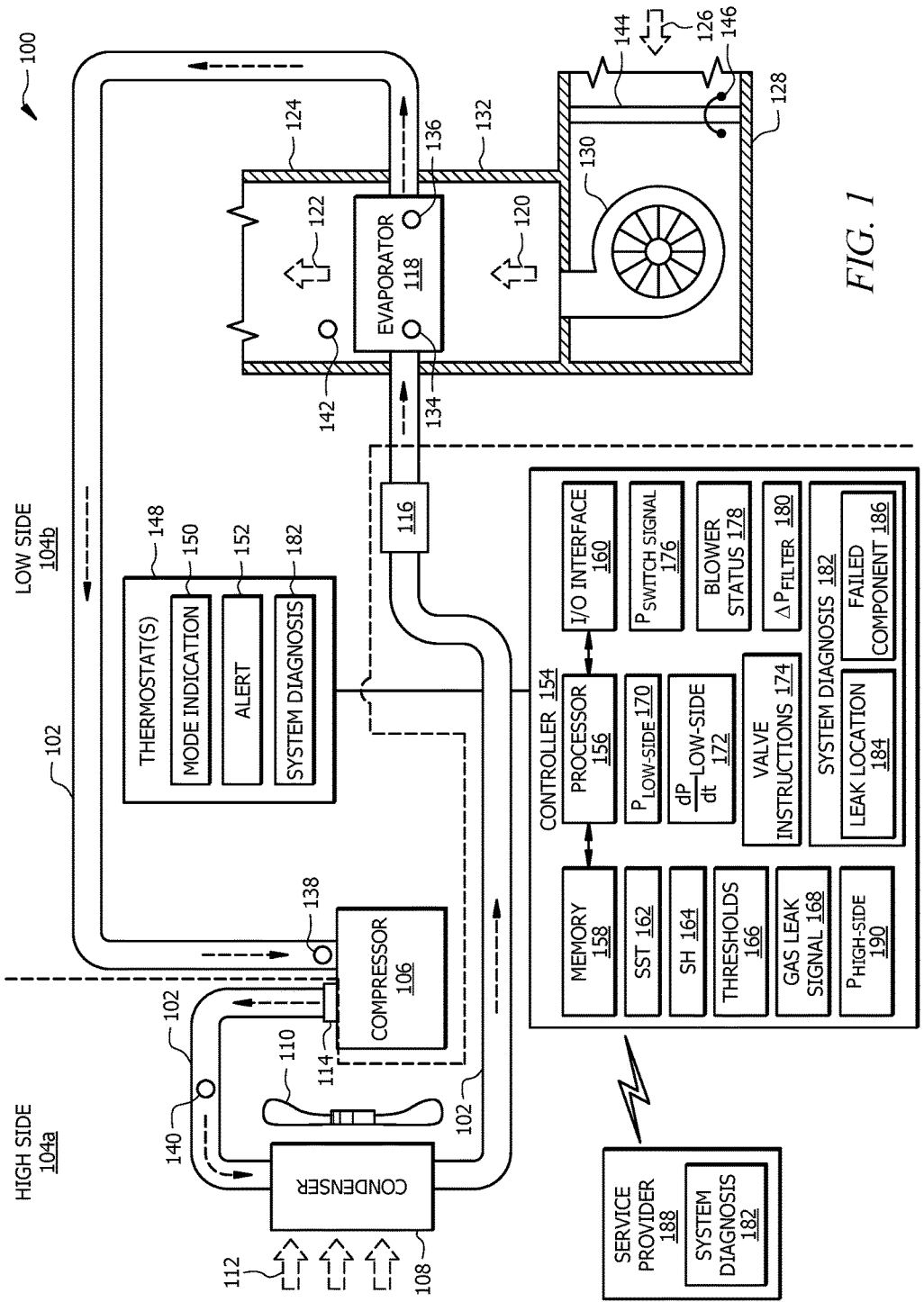
FIG. 1 is a diagram of an example HVAC system configured for leak detection and diagnosis.
Figure 2:
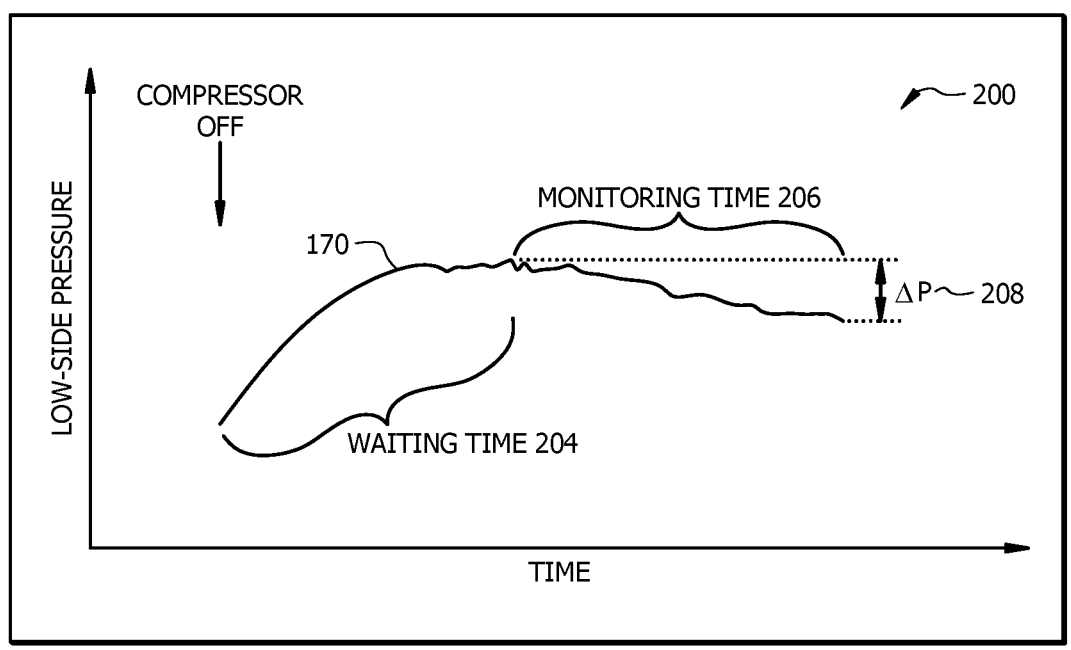
FIG. 2 is a plot of an example measured low-side pressure over time for leak detection.
Figure 3:
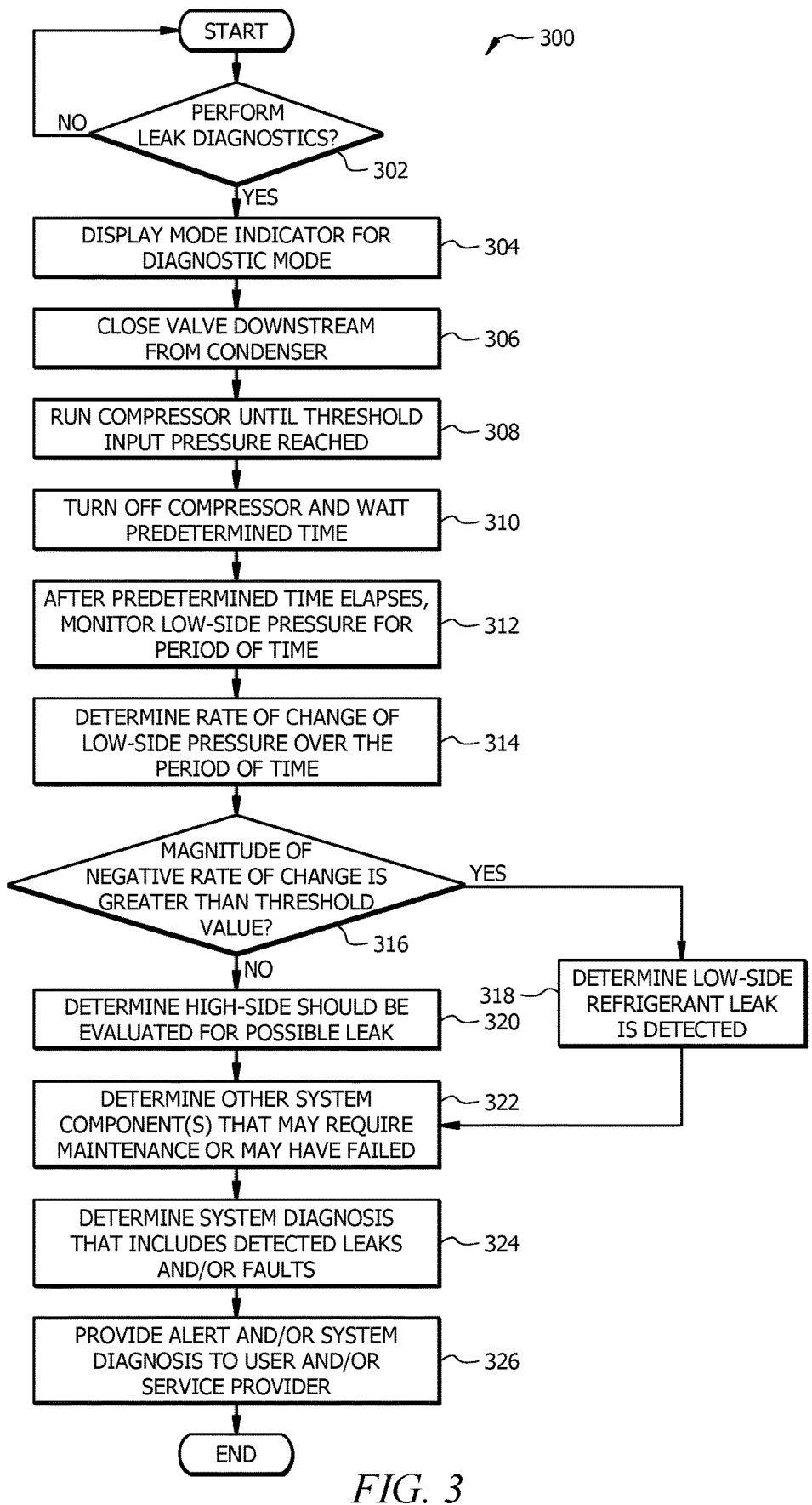
FIG. 3 is a flowchart of an example method of operating the HVAC system of FIG. 1 to detect a refrigerant leak and determine a system diagnosis.

Embodiments of the present disclosure and its advantages are best understood by referring to FIGS. 1-3 of the drawings, like numerals being used for like and corresponding parts of the various drawings.

As described above, prior to this disclosure, there was a lack of tools for reliably detecting and locating/diagnosing refrigerant leaks. The system described in this disclosure facilitates the detection of refrigerant leaks and the proactive determination of a likely diagnosis of which portion, or subsystem, of the HVAC system is leaking refrigerant. Once a location of the leak is determined, a system diagnosis including this information may be provided proactively to an occupant of the space and/or a service provider, such that appropriate maintenance can be provided more rapidly than was possible using previous leak detection technology.

As used in the present disclosure, a "saturated" refrigerant refers to a fluid in the liquid state that is in thermodynamic equilibrium with the vapor state of the fluid for a given pressure. A "saturated" refrigerant is said to be at the saturation temperature for a given pressure. If the temperature of a saturated liquid is increased above the saturation temperature, the saturated liquid generally begins to vaporize. A "superheated" refrigerant refers to a fluid in the vapor state that is heated to a temperature that is greater than the saturation temperature of the fluid at a given pressure.

HVAC System

FIG. 1 is a schematic diagram of an example HVAC system 100 configured to detect and locate system faults, such as a leak of refrigerant. The HVAC system 100 conditions air for delivery to a space. The space may be, for example, a room, a house, an office building, a warehouse, or the like. In some embodiments, the HVAC system 100 is a rooftop unit (RTU) that is positioned on the roof of a building, and conditioned air 122 is delivered to the interior of the building. In other embodiments, portion(s) of the HVAC system 100 may be located within the building and portion(s) outside the building. The HVAC system 100 may be configured as shown in FIG. 1 or in any other suitable configuration. For example, the HVAC system 100 may include additional components or may omit one or more components shown in FIG. 1.

The HVAC system 100 includes a working-fluid conduit subsystem 102, a compressor 106, a condenser 108, an outdoor fan 110, a check valve 114, an expansion device 116, an evaporator 118, a blower 130, sensors 134, 136, 138, 140, 142, 146, a return air filter 144, one or more thermostats 148, and a controller 154. As described in greater detail below, the controller 154 of the HVAC system 100 is generally configured to determine that refrigerant leak diagnostics should be performed, for instance, based on a timer/schedule or the detection of a likely leak of refrigerant (e.g., based on a change in low-side pressure 170 or high-side pressure 190 and/or a gas leak signal 168). If it is determined that the refrigerant leak diagnostics should be performed, the expansion valve 116 may be closed between the high-pressure subsystem 104a and low-pressure subsystem 104b of the HVAC system 100. The compressor 100 is then operated until a predetermined input refrigerant pressure (e.g., low-side pressure 170 measured by sensor 138) is reached. Operation of the compressor 106 is then stopped, and the low-side pressure 170 of the low-pressure subsystem 104b of the HVAC system 100 is monitored for a period of time. The rate of change 172 of this monitored low-side pressure 170 is used to determine a leak location of the refrigerant (e.g., whether refrigerant is leaking from the low-pressure subsystem 104b or high-pressure subsystem 104a of the HVAC system 100). Operation of the controller 154 is described in greater detail below and with respect to the method of FIG. 3. In some cases, the system diagnosis 182 may be automatically provided to a service provider 188 (e.g., a maintenance provider). This may facilitate proactive repairs of the HVAC system 100, such that there is limited or no downtime during which desired heating or cooling is not available.

The working-fluid conduit subsystem 102 facilitates the movement of a refrigerant through a refrigeration cycle such that the refrigerant flows as illustrated by the dashed arrows in FIG. 1. The working-fluid conduit subsystem 102 includes conduit, tubing, and the like that facilitates the movement of refrigerant between components of the HVAC system 100. The refrigerant may be any acceptable refrigerant including, but not limited to, fluorocarbons (e.g. chlorofluorocarbons), ammonia, non-halogenated hydrocarbons (e.g. propane), hydroflurocarbons (e.g. R-410A), or any other suitable type of refrigerant. In some cases, the refrigerant may be flammable or pose a risk to occupants of the space cooled by the HVAC system 100.

The HVAC system 100 generally includes a "high side" or high-pressure subsystem 104a and a "low side" or low-pressure subsystem 104b. The high-pressure subsystem 104a generally includes components and portions of the working-fluid conduit subsystem 102 that contain refrigerant at a relatively high pressure (e.g., after the refrigerant is pressurized, or compressed, by the compressor 106. The low-pressure subsystem 104b includes components and portions of the working-fluid conduit subsystem 102 that contain refrigerant at a relatively low pressure (e.g., after the refrigerant is expanded by the expansion device 116). In some cases, the high-pressure subsystem 104a is primarily located outdoors, while the low-pressure subsystem 104b may be located indoors.

The HVAC system 100 includes a compressor 106, a condenser 108, and a fan 110. In some embodiments, the compressor 106, condenser 108, and fan 110 are combined in an outdoor unit while at least certain other components of the HVAC system 100 may be located indoors (e.g., components of the low-pressure subsystem 104b). The compressor 106 is coupled to the working-fluid conduit subsystem 102 and compresses (i.e., increases the pressure of) the refrigerant. The compressor 106 may be a single-speed, variable-speed, or multiple stage compressor. A single-speed compressor is generally configured to operate at a single, predefined speed. A variable-speed compressor is generally configured to operate at different speeds to increase the pressure of the refrigerant to keep the refrigerant moving along the working-fluid conduit subsystem 102. In the variable-speed compressor configuration, the speed of compressor 106 can be modified to adjust the cooling capacity of the HVAC system 100. Meanwhile, in the multi-stage compressor configuration, one or more compressors can be turned on or off to adjust the cooling capacity of the HVAC system 100.

The compressor 106 is in signal communication with the controller 154 using wired and/or wireless connection. The controller 154 provides commands or signals to control operation of the compressor 106 and/or receives signals from the compressor 106 corresponding to a status of the compressor 106. For example, the controller 154 may transmit signals to adjust compressor speed and/or staging. The controller 154 may operate the compressor 106 in different modes corresponding, for example, to an operating mode indication 150 (e.g., a heating, cooling, or diagnostic mode), to load conditions (e.g., the amount of cooling or heating required by the HVAC system 100), to a difference between a setpoint temperature and an indoor air temperature, and the like.

A check valve 114 may be positioned at the outlet of the compressor 106. The check valve prevents backflow of refrigerant into the compressor 106 when the compressor 106 is not operated (e.g., as in during at least a portion of the diagnostic operations described in this disclosure). The check valve 114 may be operated based on a pressure of refrigerant in the conduit 102 connecting the compressor 106 to the condenser 108 relative to the pressure of refrigerant in the compressor 106. For example, if the pressure in the conduit 102 exceeds the pressure in the condenser 106, then the check valve 114 may automatically close to prevent backflow of refrigerant into the compressor 106. In some cases, the check valve 114 may be controlled by the controller 154. For example, the check valve 114 may be in signal communication with the controller 154 using wired and/or wireless connection. In such cases, the controller 154 provides commands or signals to control operation of the check valve 114. For example, the controller 154 may cause the check valve 114 to be appropriately adjusted to prevent the refrigerant from flowing into the outlet of the compressor 106 after operation of the compressor 106 is stopped for refrigerant leak diagnostics.

The condenser 108 is generally located downstream of the compressor 106 and is configured, when the HVAC system 100 is operating in a cooling mode, to remove heat from the refrigerant. The fan 110 is configured to move air 112 across the condenser 108. For example, the fan 110 may be configured to blow outside air through the condenser 108 to help cool the refrigerant flowing therethrough. In the cooling mode, the compressed, cooled refrigerant flows from the condenser 108 toward the expansion device 116.

The expansion device 116 is coupled to the working-fluid conduit subsystem 102 downstream of the condenser 108 and is configured to remove pressure from the refrigerant. The expansion device 116 is generally a controllable valve positioned in refrigerant conduit of the working-fluid conduit subsystem 102 that connects the condenser 108 to the evaporator 118. In this way, the refrigerant is delivered to the evaporator 118 and receives heat from airflow 120 to produce a conditioned airflow 122 that is delivered by a duct subsystem 124 to the conditioned space. In general, the expansion device 116 may be a valve such as an expansion valve or a flow control valve (e.g., a thermostatic expansion valve) or any other suitable valve for removing pressure from the refrigerant while, optionally, providing control of the rate of flow of the refrigerant. In some cases, the expansion device 116 may include two devices, for example, a thermostatic expansion valve (TXV) with a solenoid valve located upstream of the TXV. The expansion device 116 may be in communication with the controller 154 (e.g., via wired and/or wireless communication) to receive control signals for opening and/or closing associated valves and/or provide flow measurement signals corresponding to the rate of refrigerant flow through the working-fluid conduit subsystem 102.

The evaporator 118 is generally any heat exchanger configured to provide heat transfer between air flowing through (or across) the evaporator 118 (i.e., air 120 contacting an outer surface of one or more coils of the evaporator 118) and refrigerant passing through the interior of the evaporator 118, when the HVAC system 100 is operated in the cooling mode. The evaporator 118 may include one or more circuits. The evaporator 118 is fluidically connected to the compressor 106, such that refrigerant generally flows from the evaporator 118 to the compressor 106. A portion of the HVAC system 100 is configured to move air 120 across the evaporator 118 and out of the duct subsystem 124 as conditioned air 122. In some embodiments, the HVAC system 100 may include a heating element (not shown for clarity and conciseness). The heating element is generally any device for heating the flow of air 120 and providing heated air 122 to the conditioned space, when the HVAC system 100 operates in a heating mode.

Return air 126, which may be air returning from the building, air from outside, or some combination, is pulled into a return duct 128. An inlet or suction side of the blower 130 pulls the return air 126. The return air 126 may pass through an air filter 144. The air filter 144 is generally a piece of porous material that removes particulates from the return air 126. As described further below, sensor(s) 146 may be located on each side of the air filter 144 and configured to measure an air pressure drop 180 across the air filter 144. The air pressure drop 180 may be used to determine when the air filter 144 is blocked by accumulated particulates and should be changed. The blower 130 discharges air 120 into a duct 132 such that air 120 crosses the evaporator 118 to produce conditioned air 122. The blower 130 is any mechanism for providing a flow of air through the HVAC system 100. For example, the blower 130 may be a constant-speed or variable-speed circulation blower or fan. Examples of a variable-speed blower include, but are not limited to, belt-drive blowers controlled by inverters, direct-drive blowers with electronic commuted motors (ECM), or any other suitable type of blower.

The blower 130 is in signal communication with the controller 154 using any suitable type of wired and/or wireless connection. The controller 154 is configured to provide commands and/or signals to the blower 130 to control its operation. For example, the controller 154 may receive an indication of the blower status 178 indicating whether the blower is operating as intended. Generally, when functioning as intended, the blower 130 provides airflow 120 across the evaporator 118, but the blower may not provide the appropriate or expected airflow 120 when the blower 130 is not functioning as intended. The controller 154 may include the blower status 178 in the system diagnosis 182 to improve the system diagnosis 182. For example, this may improve the speed with which a malfunctioning blower 130 can be repaired.

The HVAC system 100 includes one or more of the sensors 134, 136, 138, 140, 142, 146 illustrated in FIG. 1. The sensors 134, 136, 138, 140, 142, 146 are in wired and/or wireless signal communication with controller 154. Signals corresponding to the properties measured by sensors 134, 136, 138, 140, 142, 146 are provided to the controller 154. In some embodiments, one or more of the sensors 134, 136, 138, 140, 142, 146 or another sensor integrated with the HVAC system 100 may be an internet-of-things (IOT) device. For example, one or more of the sensors 134, 136, 138, 140, 142, 146 may communicate wirelessly with the controller 154 (e.g., via a wireless network associated with the conditioned space). In other examples, the HVAC system 100 may include other sensors (not shown for clarity and conciseness) positioned and configured to measure any other property associated with operation of the HVAC system 100 (e.g., the temperature and/or relative humidity of air at one or more locations within the conditioned space and/or outdoors).

Sensors 134 and 136 are positioned proximate or inside the evaporator 118 to measure properties of the refrigerant flowing therethrough. For example, sensors 134, 136 may measure temperatures and/or pressures of the refrigerant at different points in the evaporator 118. The measured temperatures and/or pressures may be used by the controller 154 to determine a superheat (SH) 164. SH 164 is the difference between the temperature of refrigerant exiting the evaporator 118 (e.g., measured by sensor 136) and the vaporization temperature of the refrigerant in the evaporator 118 (e.g., measured via temperature or pressure measured by sensor 134). For example, the first evaporator sensor 134 may be positioned and configured to measure a saturated suction temperature (SST) 162 of the refrigerant in the evaporator 118, while the second sensor 136 may be positioned and configured to measure a superheated vapor temperature of the refrigerant in the evaporator 118. The controller 154 may determine the SH 164 based on a difference between the SST 162 and the superheated vapor temperature. If both the SST 162 is less than a threshold value 166 and the SH 164 is less than a threshold value 166, a refrigerant leak may be detected by the controller 154.

Sensor 138 is located proximate the inlet of the compressor 106 or in the portion of the working-fluid conduit 102 leading into the inlet of the compressor 106. While in the example of FIG. 1, the sensor 138 is shown relatively near the inlet of the compressor 106, this sensor 138 could be located further upstream from the inlet of the compressor 106 (e.g., nearer the outlet of the evaporator 118). The controller 154 uses a signal from the sensor 138 to determine the low-side pressure 170. The low-side pressure 170 is a pressure of refrigerant in the low-pressure subsystem 104b of the HVAC system 100. In some cases, the SST 162 may be determined from a pressure (e.g., low-side pressure 170) measured by sensor 138. In some embodiments, the sensor 138 includes a pressure switch. A pressure switch signal 176 provided to the controller 154 by such a pressure switch may be used to determine when the low-side pressure 170 is less than a threshold value 166 for stopping operation of the compressor 106 in order to perform leak diagnostics, as described further below and with respect to FIG. 3.

Sensor 140 measures a high-side pressure 190. The high-side pressure 190 is the pressure of the refrigerant in the high-pressure subsystem 104a of the HVAC system 100. While in the example of FIG. 1, the sensor 140 is shown between the outlet of the compressor 106 and the inlet of the condenser 108, this sensor 140 could be located at another position in the high-pressure subsystem 104a of the HVAC system 100 (e.g., proximate or downstream of the outlet of the condenser 108). The controller 154 uses a signal from the sensor 140 to determine the high-side pressure 190.

Sensor 142 is positioned and configured to measure a discharge air temperature of airflow 122 or a temperature of air provided to the space conditioned by the HVAC system 100. Sensor(s) 146 may be located on each side of the air filter 144 and configured to measure an air pressure drop 180 across the air filter 144. The air pressure drop 180 may be used to determine when the air filter 144 is blocked and/or should be changed. This information may be used to improve the system diagnosis 182 determined by the controller 154 (e.g., by including an indication of a blockage of the air filter 144 in the system diagnosis 182).

Information from sensors 134, 136, 138, 140, 142 may be used to determine that a refrigerant leak is detected. For example, if one or both of the low-side pressure 170 and the high-side pressure 190 decreases below a corresponding threshold 166, a leak may be detected. In some cases, one or more of the sensors 134, 136, 138, 140, 142 may include a leak detection device, such as a gas sensor configured to detect refrigerant gas that is emitted from the HVAC system 100. Such a sensor may provide a gas leak signal 168 to the controller 154 to indicate that a refrigerant leak is detected and that leak diagnostics are needed to determine a location of the refrigerant leak.

The HVAC system 100 includes one or more thermostats 148, for example, located within the conditioned space (e.g. a room or building). The thermostat(s) 148 are generally in signal communication with the controller 154 using any suitable type of wired and/or wireless connection. In some embodiments, one or more functions of the controller 154 may be performed by the thermostat(s) 148. For example, the thermostat 148 may include the controller 154. The thermostat(s) 148 may include one or more single-stage thermostats, one or more multi-stage thermostat, or any suitable type of thermostat(s). The thermostat(s) 148 are configured to allow a user to input a desired temperature or temperature setpoint for the conditioned space and/or for a designated space or zone, such as a room, in the conditioned space. The thermostat(s) generally include or are in communication with a sensor for measuring an indoor air temperature (e.g., sensor 142).

The controller 154 may use information from the thermostat 148 such as the temperature setpoint, indoor air temperature, and/or mode indication 150 for controlling the compressor 106, the blower 130, and the fan 110. In some embodiments, a thermostat 148 includes a user interface and/or display for displaying information related to the operation and/or status of the HVAC system 100. For example, the user interface may display operational, diagnostic, and/or status messages and provide a visual interface that allows at least one of an installer, a user, a support entity, and a service provider to perform actions with respect to the HVAC system 100. For example, the user interface may provide for display of the mode indication 150, which indicates a current operating mode of the HVAC system 100, such as whether the HVAC system 100 is operating to provide cooling or heating or if the HVAC system 100 is temporarily operating in a diagnostic mode (e.g., with the compressor 106 turned off for a period of time). The user interface may display an alert 152, for example, indicating a refrigerant leak is detected for the HVAC system 100. The user interface may display a system diagnosis 182 determined by the controller 154 based on outcomes of the leak diagnostics described below and with respect to FIG. 3. The system diagnosis 182 generally includes an indication of a refrigerant leak location 184 and/or a failed component 186 of the HVAC system 100 that was determined to have failed.

As described in greater detail below, the controller 154 is configured to determine a system diagnosis 182 for a detected refrigerant leak. The system diagnosis 182 may be presented on the display of the thermostat 148 and/or to a service provider 188 to ensure maintenance is performed rapidly and accurately with little or no downtime during which cooling is not available. The controller includes a processor 156, memory 158, and input/output (I/O) interface 160. The processor 156 includes one or more processors operably coupled to the memory 158. The processor 156 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs) that communicatively couples to memory 158 and controls the operation of HVAC system 100. The processor 156 may be a programmable logic device, a microcontroller, a microprocessor, or any suitable combination of the preceding. The processor 156 is communicatively coupled to and in signal communication with the memory 158. The one or more processors are configured to process data and may be implemented in hardware or software. For example, the processor 156 may be 8-bit, 16-bit, 32-bit, 64-bit or of any other suitable architecture. The processor 156 may include an arithmetic logic unit (ALU) for performing arithmetic and logic operations, processor registers that supply operands to the ALU and store the results of ALU operations, and a control unit that fetches instructions from memory 158 and executes them by directing the coordinated operations of the ALU, registers, and other components. The processor 156 may include other hardware and software that operates to process information, control the HVAC system 100, and perform any of the functions described herein (e.g., with respect to FIGS. 2 and 3). The processor 156 is not limited to a single processing device and may encompass multiple processing devices. Similarly, the controller 154 is not limited to a single controller but may encompass multiple controllers.

The memory 158 includes one or more disks, tape drives, or solid-state drives, and may be used as an over-flow data storage device, to store programs when such programs are selected for execution, and to store instructions and data that are read during program execution. The memory 158 may be volatile or non-volatile and may include ROM, RAM, ternary content-addressable memory (TCAM), dynamic random-access memory (DRAM), and static random-access memory (SRAM). The memory 158 is operable (e.g., or configured) to store information used by the controller 154 and/or any other logic and/or instructions for performing the function described in this disclosure.

The I/O interface 160 is configured to communicate data and signals with other devices. For example, the I/O interface 160 may be configured to communicate electrical signals with components of the HVAC system 100 including the compressor 106, fan 110, expansion device 116, sensors 134, 136, 138, 140, 142, 146, blower 130, and thermostat(s) 148. The I/O interface 160 may be configured to communicate with other devices and systems, such as the service provider 188. The I/O interface 160 may provide and/or receive, for example, compressor speed signals blower speed signals, temperature signals, relative humidity signals, thermostat calls, temperature setpoints, environmental conditions, and an operating mode status for the HVAC system 100 and send electrical signals to the components of the HVAC system 100. The I/O interface 160 may include ports or terminals for establishing signal communications between the controller 154 and other devices. The I/O interface 160 may be configured to enable wired and/or wireless communications.

In an example operation of HVAC system 100, the HVAC system 100 starts up to operate in the cooling mode. For example, in response to the indoor temperature increasing above a temperature setpoint while the HVAC system 100 is set to operate in the cooling mode (e.g., based on mode indication 150), the controller 154 may cause the compressor 106, fan 110 and blower 130 to operate. During operation of the HVAC system 100, the controller 154 (e.g., the processor 156 of the controller 154) determines refrigerant leak diagnostics should be performed. For instance, the controller 154 may determine that it has been at least a threshold time since the last leak diagnostics was run (e.g., based on a schedule and/or timer of the controller 154). As another example, a possible leak of refrigerant may be detected from the HVAC system 100 that indicates refrigerant leak diagnostics should be performed. As described above, the possible refrigerant leak may be detected based on information from one or more of the sensors 134, 136, 138, 140, 142. For instance, a drop in the low-side pressure 170 below a corresponding threshold 166, a drop of the high-side pressure 190 below a corresponding threshold 166, and/or receipt of a gas leak signal 168 may be used to determine the possible refrigerant leak. In some cases, after determining that the possible leak of refrigerant is detected, the controller 154 may cause display of a mode indication 150 on the thermostat 148 that indicates that the HVAC system 100 is operating in a diagnostic mode. During operation in the diagnostic mode, cooling or heating may not be available for a period of time. Providing this information to occupants of the space via the thermostat 148 may improve usability of the HVAC system 100, such that occupants do not think another issue is causing the brief inability to perform cooling or heating.

After determining that the refrigerant leak diagnostics should be performed, the controller 154 causes the expansion valve 116 to close. For example, valve instructions 174 may be provided to close the expansion valve 116 (e.g., to close a solenoid valve of the expansion valve 116). After the expansion valve 116 is closed, refrigerant cannot flow from the high-pressure subsystem 104a into the low-pressure subsystem 104b. The controller 154 then causes the compressor 106 to operate until a predetermined low-side pressure 170 is reached on the inlet side of the compressor 106. For example, the compressor 106 may operate until the low-side pressure 170 measured by sensor 138 decreases to at least a threshold value 166. After the predetermined low-side pressure 170 is reached, operation of the compressor 106 is stopped. If needed, the controller 154 may also adjust the check valve 114 after operation of the compressor 106 is stopped, such that the refrigerant from the high-pressure subsystem 104a cannot backflow through the compressor 106 into the low-pressure subsystem 104b. For example, the check valve 114 may be closed. In some cases, the check valve 114 is a one-way valve which prevents backflow of refrigerant into the compressor 106 without action from the controller 154. At this point, a majority of the refrigerant may be present in the high-pressure subsystem 104a, which is all or mostly outdoors, such that any leak of refrigerant from the low-pressure subsystem 104b will present a decreased risk to occupants of the indoor space.

After a predetermined wait time (e.g., a threshold 166 wait time, or the waiting time 204 of FIG. 2, described below), the controller 154 monitors the low-side pressure 170 for some time (e.g., the monitoring time 206 of FIG. 2) and determines a rate of change 172 of the low-side pressure 170 over time. This rate of change 172 is used to determine whether the detected leak is occurring in the high-pressure subsystem 104a or the low-pressure subsystem 104b. For example, if the rate of change 172 is negative and a magnitude of the rate of change 172 is greater than a threshold value 166, the controller 154 may determine that the leak location 184 of the refrigerant is in the low-pressure subsystem 104b of the HVAC system 100. Alternatively, if one or both of the rate of change 172 is not negative or the magnitude of the rate of change 172 is not greater than the threshold value 166, the controller 154 may determine that the leak location 184 of the refrigerant may be in the high-pressure subsystem 104*a*. The controller 154 then determines the system diagnosis 182 that includes the determined leak location 184. The system diagnosis 182 may be displayed via the thermostat 148 and/or provided to the service provider 188, as described above.

To further illustrate the refrigerant leak diagnostics described above, FIG. 2 shows an example plot 200 of the low-side pressure 170 as a function of time beginning from when the compressor 106 is turned off. After the compressor is turned off, the controller 154 waits for a waiting time 204 to allow the low-side pressure 170 to equilibrate. The low-side pressure 170 may increase initially during the waiting time 204 because the temperature of the refrigerant may increase after the compressor 106 is turned off. The controller 154 then monitors the low-side pressure 170 for a monitoring time 206. During this monitoring time 206, the controller 154 may determine the rate of change 172 of the low-side pressure 170. The rate of change 172 may be determined, for example, as the change in pressure 208 over the monitoring time 206.

Returning to FIG. 1, in some cases, the controller 154 may also check the functioning of other components of the HVAC system 100 and include such findings in the system diagnosis 182. Information about functions of other system components may improve the determination of appropriate maintenance actions to take to ensure continued reliable operation of the HVAC system 100. For example, the controller 154 may determine the blower status 178 from information provided by the blower 130 (if this information is available). If the blower status 178 indicates that the blower 130 is not operating as intended, the blower 130 may be included as a failed component 186 in the system diagnosis 182. As another example, the controller 154 may detect a blockage of the air filter 144 if the air pressure drop 180 across the air filter 144 is greater than a threshold value 166. If such a blockage is detected, the air filter 144 may be indicated as a failed component 186 in the system diagnosis (e.g., because of the need to clean or replace the air filter 144).

Example Methods of HVAC System Prognostics and Diagnostics

FIG. 3 illustrates a method 300 of automatically locating and diagnosing a possible refrigerant leak in the HVAC system 100 of FIG. 1. The method 300 may be implemented using the processor 156, memory 158, and I/O interface 160 of the controller 154 of FIG. 1. The method 300 may begin at step 302 where the controller 154 determines whether refrigerant leak diagnostics should be performed. For example, the controller 154 may determine whether it has been greater than a threshold time since the last leak diagnostic was performed For example, refrigerant leak diagnostics may be performed monthly, seasonally, or the like. As another example, refrigerant leak diagnostics may be performed when a possible refrigerant leak is detected. For example, the possible refrigerant leak may be detected based on information from one or more of the sensors 134, 136, 138, 140, 142. For instance, a drop in the low-side pressure 170 below a corresponding threshold 166, a drop of the high-side pressure 190 below a corresponding threshold 166, and/or receipt of a gas leak signal 168 may be used to determine the possible refrigerant leak. If refrigerant leak diagnostics should not be performed, the controller 154 returns to start. Otherwise, if refrigerant leak diagnostics should be performed, the controller 154 proceeds to step 304.

At step 304, the controller 154 causes display of a mode indication 150 on the thermostat 148 that indicates that the HVAC system 100 is operating in a diagnostic mode. During operation in the diagnostic mode, cooling or heating may not be available for a period of time. Providing this information to occupants of the space via the thermostat 148 may improve usability of the HVAC system 100, such that occupants do not think another issue is causing the brief inability to perform cooling or heating.

At step 306, the controller 154 causes the expansion valve 116 to close. For example, valve instructions 174 may be provided to close the expansion valve 116 (e.g., to close a solenoid valve of the expansion valve 116). At step 308, the controller 154 causes the compressor 106 to operate until a threshold low-side pressure 170 is achieved at the inlet of the compressor 106. For example, the compressor 106 may operate until the low-side pressure 170 measured by sensor 138 meets a threshold value 166.

At step 310, the controller 154 causes the compressor 106 to stop operating and waits for a predefined amount of time (e.g., for the waiting time 204 of FIG. 2). If needed, the controller 154 may also adjust the check valve 114 after operation of the compressor 106 is stopped, such that the refrigerant from the high-pressure subsystem 104*a* cannot backflow through the compressor 106 into the low-pressure subsystem 104*b*.

At step 312, the controller 154 monitors the low-side pressure 170 (e.g., as illustrated in FIG. 2) for at least a period of time (e.g., the monitoring time 206 of FIG. 2). At step 314, the controller 154 determines the rate of change 172 of the low-side pressure over the period of time. For example, referring to FIG. 2, the rate of change 172 may be determined as the change in pressure 208 over the monitoring time 206.

At step 316, the controller 154 determines if the rate of change 172 is negative and if a magnitude of the rate of change 172 is greater than a threshold value 166. If this is the case, the controller 154 proceeds to step 318 and determines that the refrigerant leak is in the low-pressure subsystem 104*b* of the HVAC system 100. Otherwise, if one or both of the rate of change 172 is not negative or the magnitude of the rate of change 172 is not greater than the threshold value 166, the controller 154 proceeds to step 320 and determines that the leak location 184 of the refrigerant may be in the high-pressure subsystem 104*a*.

At step 322, the controller 154 determines if there are any other failed components 186. For example, the controller 154 may determine the blower status 178 from information provided by the blower 130. If the blower status 178 indicates the blower 130 is not operating as intended, the blower 130 may be included as a failed component 186 in the system diagnosis 182. Similarly, a blocked air filter 144 may be included as a failed component 186, as described with respect to FIG. 1 above.

At step 324, the controller 154 determines the system diagnosis 182 which includes the leak location 184 from step 318 or 320 and any failed components 186 from step 322. At step 326, the system diagnosis 182 and/or any related alert(s) 152 (e.g., indicating a refrigerant leak) are displayed on the thermostat 148 and/or provided to the service provider 188, as described above.

Modifications, additions, or omissions may be made to method 300 depicted in FIG. 3. Method 300 may include more, fewer, or other steps. For example, steps may be performed in parallel or in any suitable order. While at times discussed as controller 154, HVAC system 100, or components thereof performing the steps, any suitable HVAC system or components of the HVAC system may perform one or more steps of the method 300.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A heating, ventilation, and air conditioning (HVAC) system, the HVAC system comprising:
    a high-pressure subsystem comprising:
        a condenser operable to receive refrigerant and transfer heat from the refrigerant to a flow of outdoor air, thereby generating a cooled refrigerant; and
        a controllable valve positioned in a refrigerant conduit connecting the condenser to an evaporator; and
    a low-pressure subsystem comprising:
        the evaporator operable to receive the cooled refrigerant and transfer heat from a flow of air to the cooled refrigerant;
        a compressor operable to compress the refrigerant; and
        a pressure sensor operable to measure a refrigerant pressure in the low-pressure subsystem; and
    a controller communicatively coupled to the pressure sensor, and the controllable valve, wherein the controller comprises a processor configured to:
        close the controllable valve;
        cause the compressor to operate until a particular refrigerant pressure is reached;
        after the particular refrigerant pressure is reached, stop operation of the compressor;
        after stopping operation of the compressor and waiting at least a particular wait time, monitor the refrigerant pressure in the low-pressure subsystem of the HVAC system for a period of time;
        determine a rate of change of the refrigerant pressure in the low-pressure subsystem for the period of time;
        if the rate of change is negative and a magnitude of the rate of change is greater than a threshold value, determine that a leak location of the refrigerant is in the low-pressure subsystem of the HVAC system; and
        if one or both of the rate of change is not negative and the magnitude of the rate of change is not greater than a threshold value, determine that the leak location of the refrigerant is in the high-pressure subsystem of the HVAC system.

2. The HVAC system of claim 1, wherein the HVAC system further comprises:
    a first sensor positioned and configured to measure a saturation temperature of the refrigerant in the evaporator; and
    a second sensor positioned and configured to measure a superheated vapor temperature of the refrigerant in the evaporator; and
    the controller is further configured to detect a possible leak of the refrigerant by:
        determining a superheat value based on a difference between the saturation temperature and the superheated vapor temperature; and
        determining that both the saturation temperature is less than a corresponding threshold value and the superheat value is greater than a corresponding threshold value.

3. The HVAC system of claim 1, wherein the processor is further configured to:
    determine a system diagnosis comprising the leak location; and
    cause the system diagnosis to be provided to a service provider associated with the HVAC system.

4. The HVAC system of claim 1, wherein the processor is further configured to:
    determine a system diagnosis comprising the leak location; and
    cause the system diagnosis to be displayed on a thermostat associated with the HVAC system.

5. The HVAC system of claim 1, wherein the processor is further configured to cause display of a mode indication on a thermostat of the HVAC system indicating that the HVAC system is operating in a diagnostic mode.

6. The HVAC system of claim 1, further comprising:
    a blower operable, when functioning as intended, to provide the flow of air across the evaporator;
    wherein the controller is further communicatively coupled to the blower and configured to:
        determine a blower status indicating whether the blower is operating as intended; and
        determine a system diagnosis comprising the leak location and the blower status.

7. The HVAC system of claim 1, further comprising:
    an air filter positioned and configured to filter the flow of air before the flow of air reaches the evaporator;
    an air filter sensor operable to measure a change in air pressure across the air filter;
    wherein the controller is further communicatively coupled to the filter sensor and configured to:
        detect a blockage of the air filter based on the change in air pressure across the air filter; and
        determine a system diagnosis comprising the leak location and an indication of the detected blockage of the air filter.

8. The HVAC system of claim 1, wherein the HVAC system further comprises a check valve positioned proximate an output of the compressor and configured to prevent the refrigerant from flowing into the outlet of the compressor after operation of the compressor is stopped.

9. A method of operating a heating, ventilation, and air conditioning (HVAC) system, the method comprising:
closing a controllable valve of the HVAC system, wherein the controllable valve is positioned in a refrigerant conduit connecting a condenser to an evaporator;
causing a compressor of the HVAC system to operate until a particular refrigerant pressure is reached;
after the predetermined refrigerant pressure is reached, causing the compressor to stop operating;
after stopping operation of the compressor and waiting at least a particular wait time, monitoring a refrigerant pressure in a low-pressure subsystem of the HVAC system for a period of time;
determining a rate of change of the refrigerant pressure in the low-pressure subsystem for the period of time;
if the rate of change is negative and a magnitude of the rate of change is greater than a threshold value, determining that a leak location of the refrigerant is in the low-pressure subsystem of the HVAC system; and
if one or both of the rate of change is not negative and the magnitude of the rate of change is not greater than a threshold value, determining that the leak location of the refrigerant is in a high-pressure subsystem of the HVAC system.

10. The method of claim 9, further comprising detecting a possible leak of refrigerant from the HVAC system by:
receiving a saturation temperature determined by a first sensor positioned and configured to measure the saturation temperature of the refrigerant in the evaporator;
receiving a superheated vapor temperature determined by a second sensor positioned and configured to measure the superheated vapor temperature of the refrigerant in the evaporator;
determining a superheat value based on a difference between the saturation temperature and the superheated vapor temperature; and
determining that both the saturation temperature is less than a corresponding threshold value and the superheat value is greater than a corresponding threshold value.

11. The method of claim 9, further comprising:
determining a system diagnosis comprising the leak location; and
causing the system diagnosis to be provided to a service provider associated with the HVAC system.

12. The method of claim 9, further comprising:
determining a system diagnosis comprising the leak location; and
causing the system diagnosis to be displayed on a thermostat associated with the HVAC system.

13. The method of claim 9, further comprising causing display of a mode indication on a thermostat of the HVAC system indicating that the HVAC system is operating in a diagnostic mode.

14. The method of claim 9, further comprising:
determining a blower status indicating whether a blower of the HVAC system is operating as intended; and
determining a system diagnosis comprising the leak location and the blower status.

15. The method of claim 9, further comprising:
detecting a blockage of an air filter of the HVAC system based on a change in air pressure across the air filter; and
determining a system diagnosis comprising the leak location and an indication of the detected blockage of the air filter.

16. A controller of a heating, ventilation, and air conditioning (HVAC) system, the controller comprising:
an input/output interface configured to communicate with:
a compressor of the HVAC system;
a controllable valve positioned in a refrigerant conduit connecting a condenser of the HVAC system to an evaporator of the HVAC system; and
a pressure sensor operable to measure a refrigerant pressure in a low-pressure subsystem of the HVAC system; and
a processor communicatively coupled to the input/output interface and configured to:
close the controllable valve;
cause the compressor to operate until a particular refrigerant pressure is reached;
after the particular refrigerant pressure is reached, stop operation of the compressor;
after stopping operation of the compressor and waiting at least a particular wait time, monitor the refrigerant pressure in the low-pressure subsystem of the HVAC system for a period of time;
determine a rate of change of the refrigerant pressure in the low-pressure subsystem for the period of time;
if the rate of change is negative and a magnitude of the rate of change is greater than a threshold value, determine that a leak location of the refrigerant is in the low-pressure subsystem of the HVAC system; and
if one or both of the rate of change is not negative and the magnitude of the rate of change is not greater than a threshold value, determine that the leak location of the refrigerant is in a high-pressure subsystem of the HVAC system.

17. The controller of claim 16, wherein:
the processor is further configured to detect a possible leak of the refrigerant by:
determining a superheat value based on a difference between a saturation temperature of refrigerant in the evaporator and a superheated vapor temperature of refrigerant in the evaporator; and
determining that both the saturation temperature is less than a corresponding threshold value and the superheat value is greater than a corresponding threshold value.

18. The controller of claim 16, wherein the processor is further configured to:
determine a system diagnosis comprising the leak location; and
cause the system diagnosis to be provided to a service provider associated with the HVAC system.

19. The controller of claim 16, wherein the processor is further configured to cause display of a mode indication on a thermostat of the HVAC system indicating that the HVAC system is operating in a diagnostic mode.

20. The controller of claim 16, wherein:
the input/output interface is further configured to communicate with an air filter sensor operable to measure a change in air pressure across an air filter positioned and configured to filter a flow of air before the flow of air reaches the evaporator; and
the processor is further configured to:
detect a blockage of the air filter based on the change in air pressure across the air filter; and
determine a system diagnosis comprising the leak location and an indication of the detected blockage of the air filter.

* * * * *